United States Patent
Paolella (10) Patent No.: US 7,639,902 B2
(45) Date of Patent: Dec. 29, 2009

(54) MICROWAVE PHOTONIC FREQUENCY DOMAIN REFLECTOMETER

(75) Inventor: Arthur C. Paolella, Jamison, PA (US)

(73) Assignee: Artisan Laboratories Corp., Jamison, PA (US)

( * ) Notice: Subject to any disclaimer, the term of this patent is extended or adjusted under 35 U.S.C. 154(b) by 452 days.

(21) Appl. No.: 11/429,333

(22) Filed: May 5, 2006

(65) Prior Publication Data
US 2009/0268196 A1 Oct. 29, 2009

(51) Int. Cl.
*H04B 10/08* (2006.01)
(52) U.S. Cl. .......................................... 385/13; 398/21
(58) Field of Classification Search ................. 385/13; 398/13, 21
See application file for complete search history.

(56) References Cited

U.S. PATENT DOCUMENTS

| 6,301,036 | B1 * | 10/2001 | Spencer ...................... 398/31 |
| 2001/0055462 | A1 | 12/2001 | Seibel |
| 2002/0176127 | A1 | 11/2002 | Garner |
| 2003/0007142 | A1 | 1/2003 | Hotate et al. |
| 2003/0058504 | A1 | 3/2003 | Cho et al. |

* cited by examiner

*Primary Examiner*—Jerry T Rahll
(74) *Attorney, Agent, or Firm*—Watov & Kipnes, P.C.; Kenneth Watov (57) ABSTRACT

A plurality of microwave signals are converted into optical signals which are directed against an optically reflective surface, whereby the optical signals reflected off of the optically reflective surface are received and converted into microwave signals, which are passed through a Fourier Transformer for extracting information of interest.

26 Claims, 9 Drawing Sheets

MICROWAVE PHOTONIC FREQUENCY DOMAIN REFLECTOMETER

RELATED APPLICATION

The present invention is related to and takes priority from co-pending Provisional Application Ser. No. 60/678,930, for "Microwave Photonic Frequency Domain Reflectometer," filed May 9, 2005, and having the same inventorship herewith. The teachings of the prior Application are incorporated herein to the extent they do not conflict with the present Application.

FIELD OF THE INVENTION

The field of the present invention is generally related to fiber optic cables and components, medical imaging systems, biometric imaging systems, and phased array antenna systems, and is more particularly related to apparatus for determining the locations of breaks (distance to fault) and poor interconnections along the length of fiber optic cables and components, to tumor detection, to biometric identification, and to optical transceivers for phase array antenna systems.

BACKGROUND OF THE INVENTION

Determining the location of failures in fiber optic cables or components along their entire optical path is critical to keep networks operating. An accurate measurement system is required to locate the failure to allow for rapid repair or replacement. Additionally, accurately determining the length of fiber optic cables is important for fiber optic delay lines used in altimeter test systems and radar test systems.

Optical time domain reflectometry (OTDR) is commonly used to determine the locations of breaks (distance-to-fault) and poor interconnects in fiber optic cables. The determination of a break, fault or poor interconnect is performed by sending an optical pulse generated by OTDR equipment through the fiber and receiving a reflected pulse due to a break or reflection in the fiber. The time between the incoming and outgoing pulse is used to calculate the distance based on the propagation velocity of the pulse through the fiber.

OTDRs are expensive and have what is commonly referred to as a "dead zone". The dead zone is the distance from the OTDR equipment to a distance along the fiber for which a determination of a break or any disturbance in an optical fiber or optical component can be made. This limitation is primarily due to the pulse width and the high optical power needed to make the measurement which causes damage to the photodetector. Proposed new time-domain techniques developed to reduce dead zones by reducing optical power or pulse width, result in more complex and costly systems, and still do not eliminate the dead zone. Dead zones can render OTDRs useless for many applications including military platforms such as aircraft, ships and helicopters; commercial systems such as antenna remoting systems, medical imaging systems, fiber-to-the-premise and cellular communication systems among others.

SUMMARY OF THE INVENTION

An accurate measurement system without a dead-zone, as proposed in this invention, can be used in applications such as imaging, both medical and hyperspectral by scanning an optical signal over a specified area, and for phased array antennas. Using a coherent optical system provides for accurate measurements with a sensitivity that approaches the quantum limit.

This present invention relates generally to a low cost method and apparatus for eliminating the dead-zone associated with OTDR through a new system that uses a Microwave Photonic Frequency Domain Reflectometer (MPFDR) technology. This system uses a method of finding and locating a distance-to-fault along a fiber either single mode or multi-mode using an electrical frequency domain reflectometry technique, whereby the electrical signal in the RF or microwave frequency range is converted into the optical domain and back.

In addition to finding faults the MPFDR can be used to determine both the insertion loss of the optical fiber under test, and the insertion loss of a complete optical system. It can also be used to characterize optical connector interfaces for poor connects and loss. It can also be used to characterize passive and active optical components such as but not limited to power dividers, power taps, multiplexers and de-multiplexers.

This invention includes the use of coherent optical techniques to improve the sensitivity toward the quantum limit of photon detection. Both the MPFDR and its coherent versions can be used in free space measurements of distance. Both can be used to image an object with the addition of a scanning system that defects the optical beam in space, and in phased array antenna systems.

BRIEF DESCRIPTION OF THE DRAWINGS

Various embodiments of the invention are described in detail below with reference to the drawings, in which like items are identified by the same reference number designations, wherein.

DETAILED DESCRIPTION OF THE INVENTION

Figure 1:
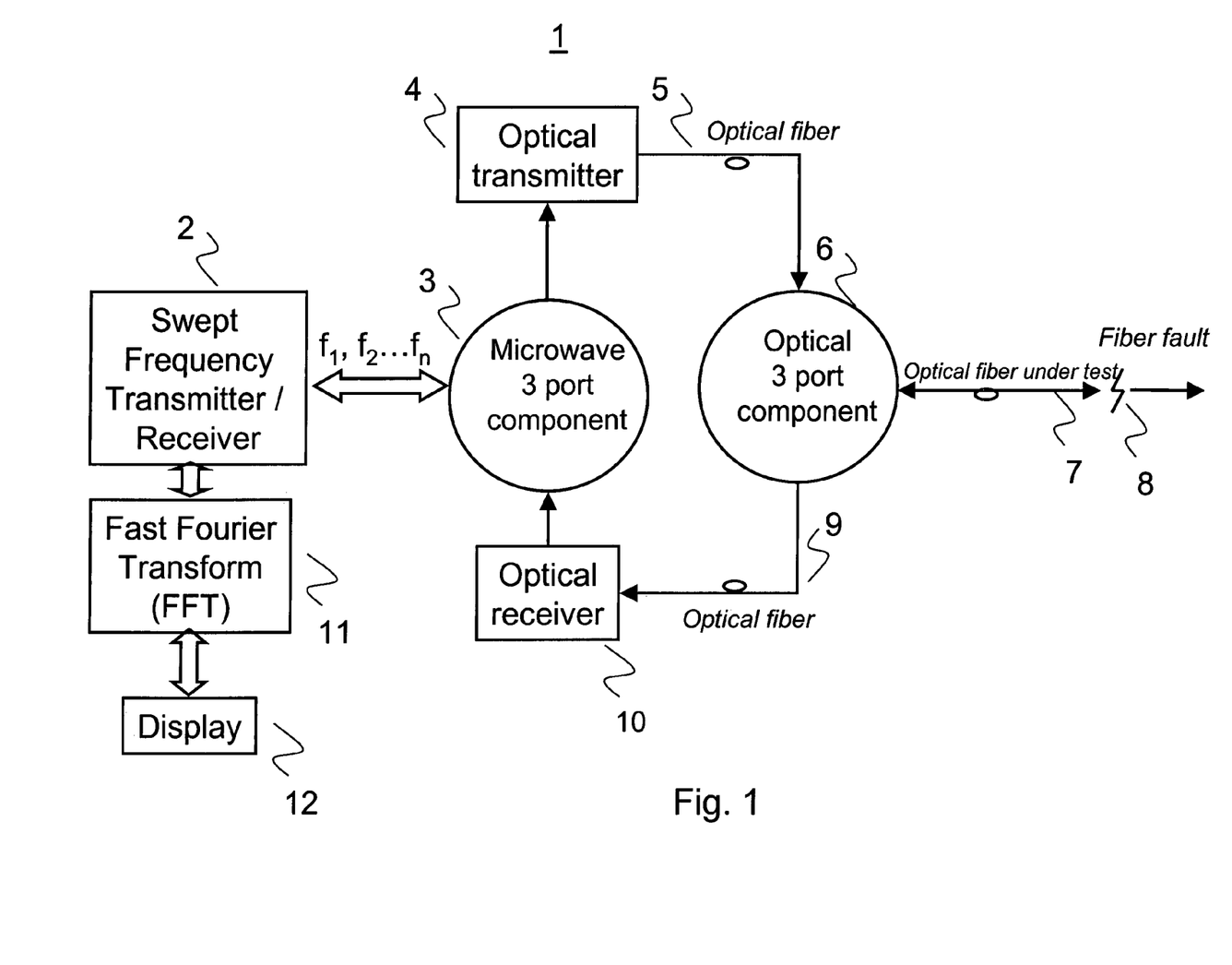
FIG. 1 is a block schematic diagram of the Microwave Photonic Frequency Domain Reflectometer for locating faults or fractures in fiber optic cables and in measuring the distance from the fault to the equipment for one embodiment of the invention.

In one embodiment of the present invention an MPFDR 1 as shown in FIG. 1, includes a swept frequency transmitter/receiver 2, which operates in the RF or microwave frequency range, and sends out a specified number of measurement frequency signals $f_1, f_2 \ldots f_n$ (where n=1, 2, 3 . . . ) over a specified bandwidth. The first signal having a frequency $f_1$ is sent to a microwave 3-port or properly terminated n-port component 3 such as but not limited to a microwave circulator, where n=3, 4, 5 . . . ). The circulator or similar component directs the signal to an optical transmitter 4 for modulating an optical carrier beam with the RF or microwave signal 5 to produce a plurality of optical signals of different frequency on the carrier beam. The modulated optical carrier beam is then sent over an optical fiber 5 or optical integrated circuit to an optical 3-port component 6. The modulated optical carrier beam exits the 3-port optical component, and is then sent over the optical fiber 7 under test. When the optical carrier beam encounters a fault 8, a reflected optical signal is sent back to the optical 3-port component 6, and therefrom the signal is sent over an optical fiber 9 or an optical integrated circuit (not shown) to an optical receiver 10. The optical receiver 10 converts the signal back to the electrical domain. The signal is then directed back to the microwave 3-port component 3, which sends the signal back to the swept frequency transmitter/receiver 2, which inputs the signals' S-parameters that include phase and amplitude information into FFT transformer 11 for storage and translation to distance. This cycle is repeated until the number of specified frequencies is completed from $f_1$ to $f_n$, where $f_n$ is the final measurement frequency.

The information derived from $f_1$ to $f_n$ are summed, and the summation is then transformed from the frequency domain to the time domain via the Fast Fourier Transformer (FFT) 11 to determine the distance to the fault, in this example. The fault location is shown on a display 12. The measurement resolution is determined by the bandwidth of the modulation frequencies from the swept frequency transmitter/receiver 2. The maximum distance is determined by the number of measurement frequencies multiplied by the resolution.

All embodiments of this invention cover single mode fibers and multi-mode fibers. The optical 3-port component 6 can be used to support both single mode fibers and multi-mode fibers. The term fiber in this document means either single mode fibers or multi-mode fibers.

Figure 2:
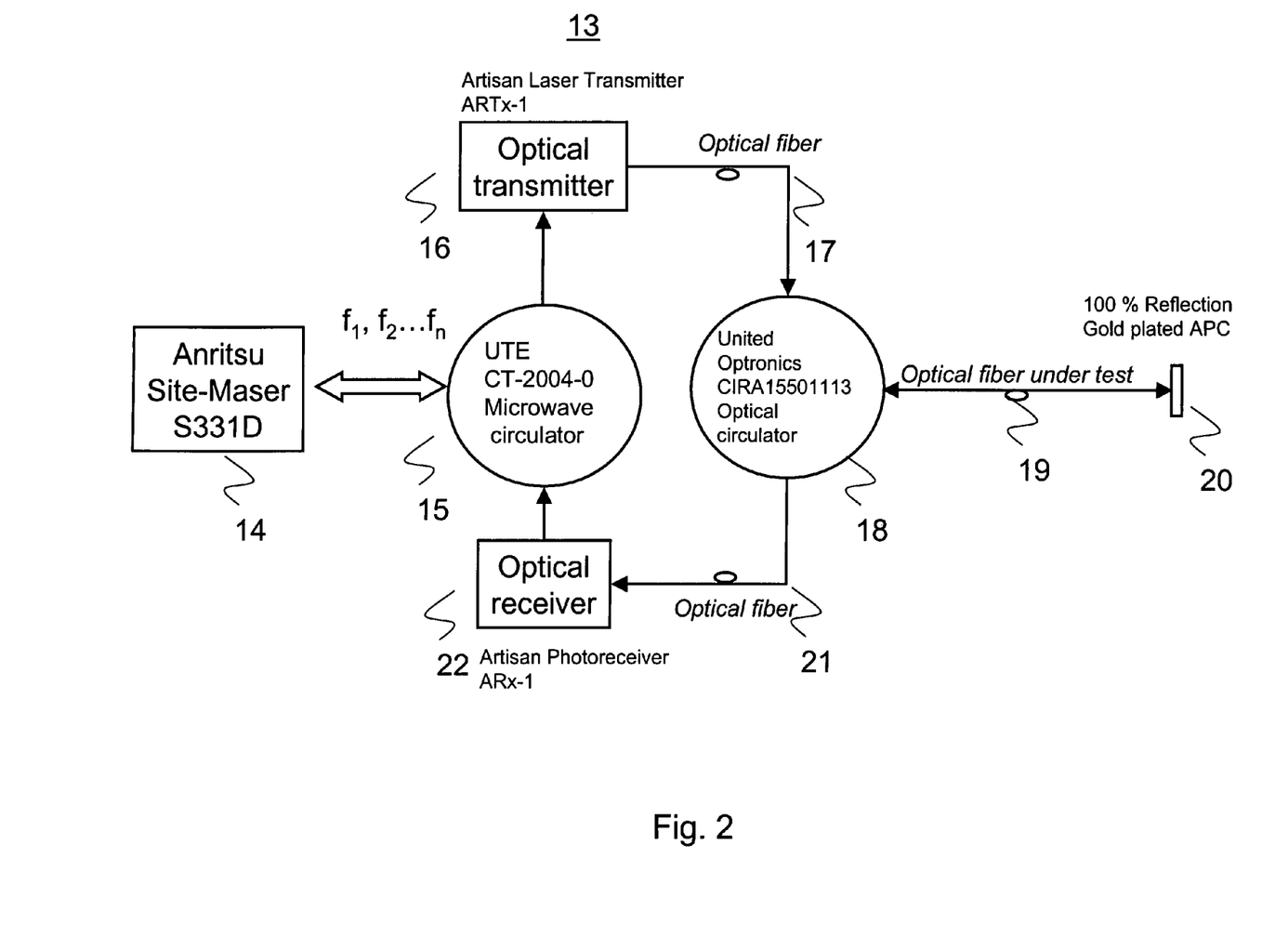
FIG. 2 is a circuit schematic diagram of the Microwave Photonic Frequency Domain Reflectometer for which a prototype working system was assembled and tested.

Referring to FIG. 2, an experimental MPFDR 13 is presented to verify the operation of the system. In this experiment, the swept frequency transmitter/receiver 2, FFT 11 and display 12 are represented by an Anritsu Site Master S331D 14. For this unit the measurement resolution is determined as follows:

$$\text{Horizontal Resolution (meter)} = (c/2)^*(v_p/\Delta f), \quad (1)$$

where c is the velocity of light, $v_p$ is the relative propagation constant, and $\Delta f$ is the bandwidth. The maximum horizontal range measurable is determined as follows:

$$\text{Range} = \frac{(\text{number of measurement frequencies} - 1)}{(\text{Horizontal Resolution})} \quad (2)$$

To set up the measurement, the Site Master 14 is turned on and set to measure distance-to-fault by pressing the appropriate button. The start and stop frequency are then entered. The number of frequency points is then set. The propagation velocity factor is then set. The microwave photonic frequency domain reflectometer 13 is then attached to the Site Master 14. A fiber cable 19 is connected to the optical circulator 18, in this example. The data is then observed on the screen.

As an example, relative propagation velocity on the Site Master 14 was set to 0.68 to match to the propagation velocity of the modulated optical carrier beam in the fiber 19. The number of measurement frequencies or number of data points was set to 516. The microwave frequency bandwidth was set on the Site Master 14 for these experiments from 1 GHz to 2 GHz that would provide a minimum measurement resolution of 10 cm and a maximum distance of over 50 meters.

Practically, for optical systems that operate up to 100 GHz; and with a number of data points at 2048, a resolution of less than 1 millimeter is obtainable. This is sufficient to resolve features in tumors that are located within the body.

The signal out of the Site Master 14 is inputted to a UTE Inc. CT-2004-0 microwave circulator 15. The circulator 15 directs the signal to an Artisan Laboratories Corporation (New Britain, Pa.) ARTx-1 optical transmitter 16 that modulates an optical carrier beam with the RF or microwave signals, thereby converting the latter into an optical signals. The optical transmitter 16 and photoreceiver 22 (Artisan Laboratories Corporation ARx-1) each have a modulation bandwidth in excess of this frequency range, which is sufficient to resolve faults at 10 cm resolution. The optical signals of the modulated optical carrier beam are then sent from optical transmitter 16, over an optical fiber 17, to a United Optronics Inc., CIRA15501113 optical circulator 18. The optical signals exit the optical circulator 18, and are then sent over the optical fiber 19 under test. When the signals encounter a reflection from the 100% reference reflection 20, reflected optical signals are sent back to the optical circulator 18, which directs the signals to be sent over optical fiber 21 into photoreceiver 22. The photoreceiver 22 converts the signals back to the electrical domain, and directs the converted signals to the microwave circulator 15 which sends the signals back to Site Master 14. When the number of measurement frequencies sent is completed, the distance to the reference reflection is shown on the display.

Figure 3:
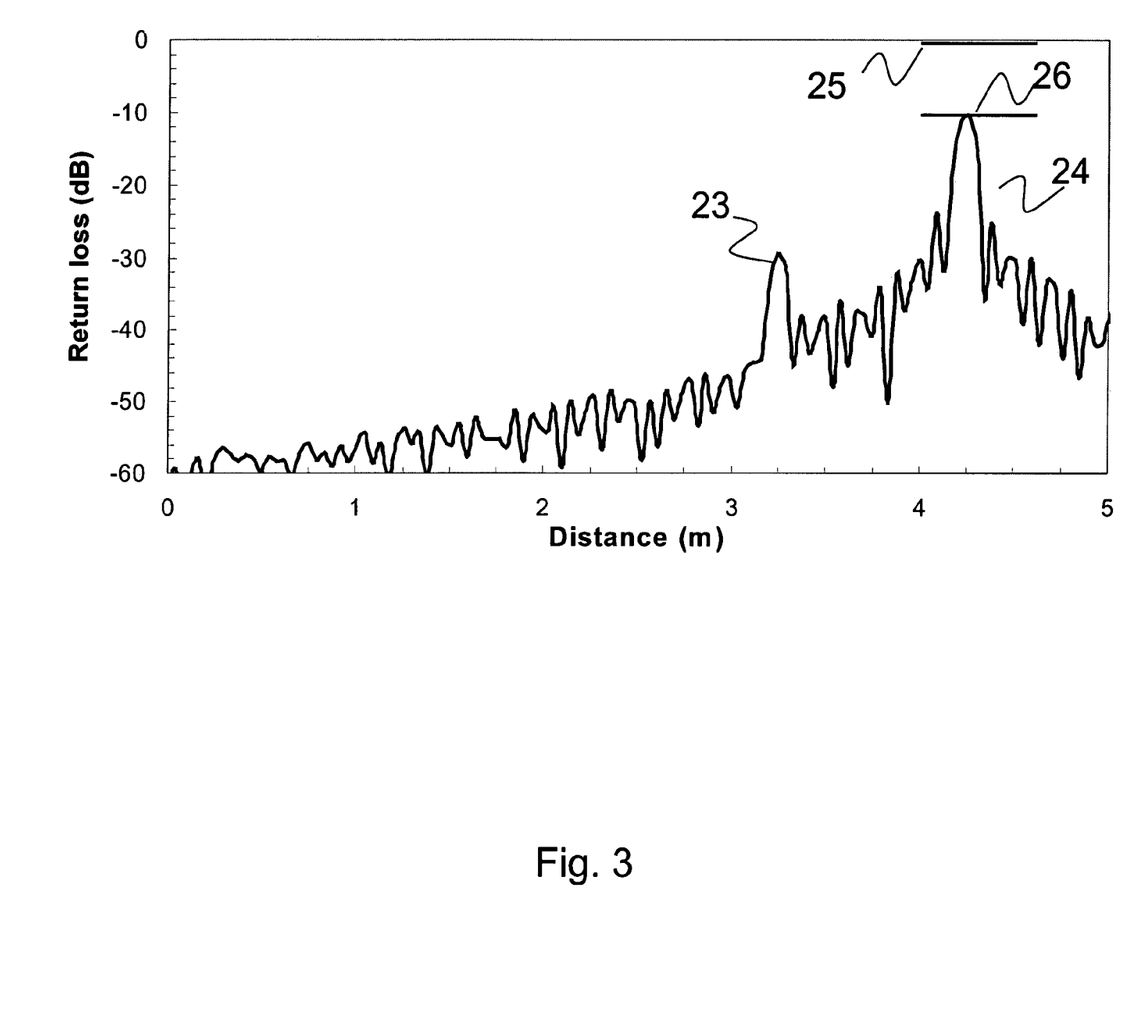
FIG. 3 is a screen shot of a commercial microwave analyzer display showing a trace with a first reference reflection, and a second small reflection due to a connector misalignment.

In the first experiment, two optical fibers are connected together as the optical fiber under test 19. As shown in the Return Loss to Distance curve of FIG. 3, fault 23 was located at 3.2 meters due to an APC to UPC connector interface. A reference reflection 24 is located 1 meter away. The reference reflection should be at a level 25 of 0 dB, but the actual reflection 26 is lower by 10 dB because of a connector interface that is causing excessive loss. Therefore the system can measure the quality of connector interfaces.

Figure 4A:
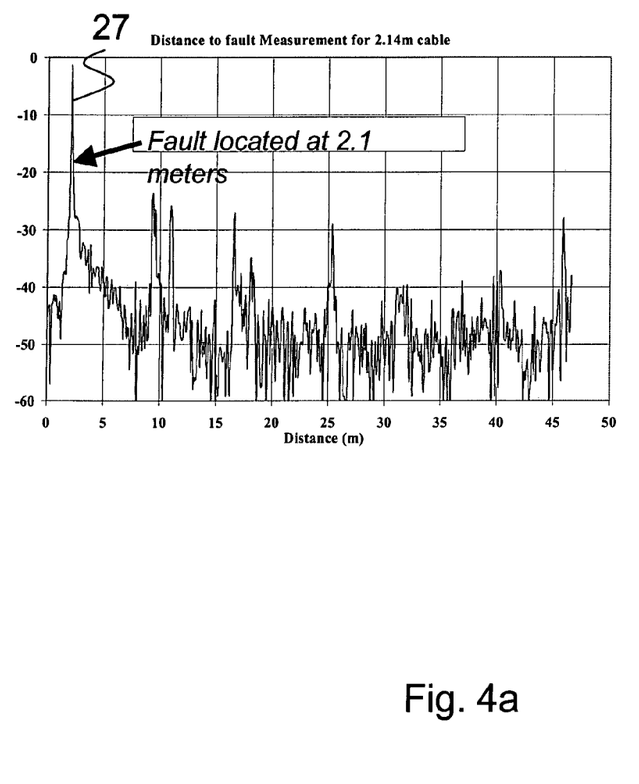
FIG. 4a is a screen shot of commercial microwave analyzer display using the Microwave Photonic Frequency Domain Reflectometer and showing a fault in a fiber optic cable located at 2.1 meters from the equipment.
Figure 4B:
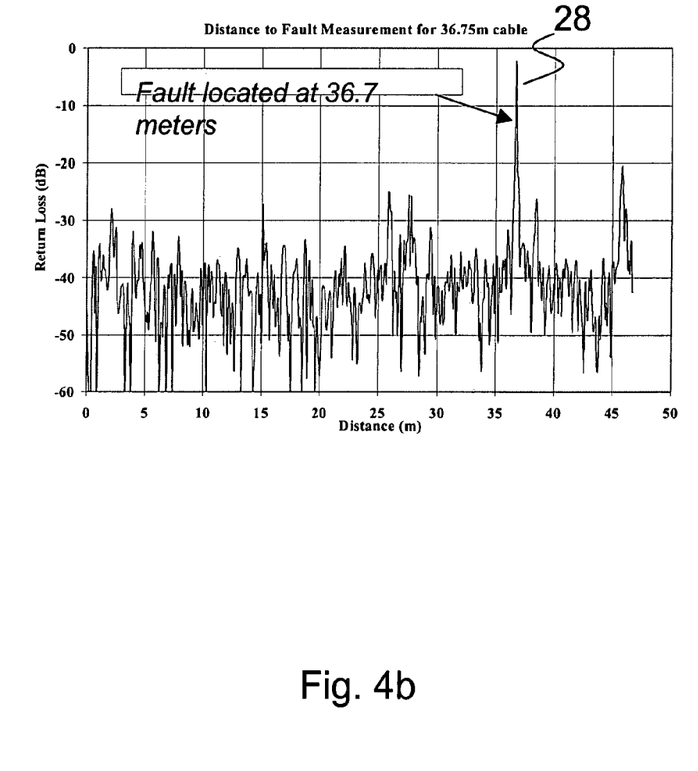
FIG. 4b is a screen shot of commercial microwave analyzer display using the Microwave Photonic Frequency Domain Reflectometer and showing a fault in a fiber optic cable located at 36.7 meters from the equipment.

In a second experiment, two different cable lengths were inserted as the optical fiber 19 under test. Fiber lengths of 2.14 meter and 36.75 meter were used. Referring to FIGS. 4a and 4b, the distance in meters is shown on the x-axis, and the return loss in decibels (dB) is shown on the y-axis. A peak 27 in the return loss is found at 2.14 meters in FIG. 4a, and a peak 28 at 36.7 meters in FIG. 4b, each away from the MPFDR 13 indicating a highly accurate location of the reflection.

Figure 5:
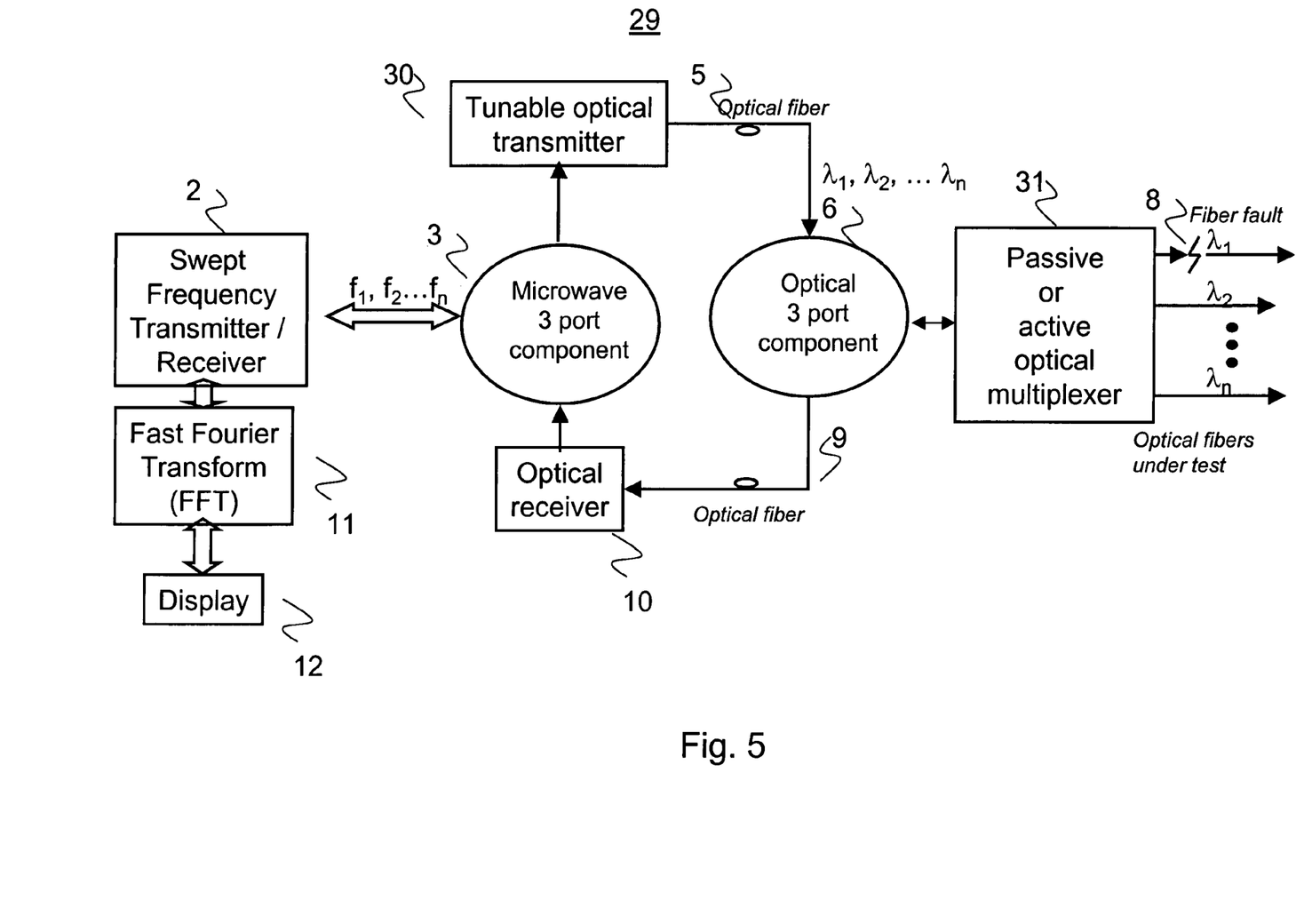
FIG. 5 is a block schematic diagram of the Microwave Photonic Frequency Domain Reflectometer in a Wavelength Division Multiplex systems (WDM) or Dense Wavelength Division Multiplex (DWDM) application using a tunable optical transmitter for an embodiment of the invention.

MPFDR 13 can be configured so that the optical carrier beam out of the transmitter 16 can be tuned in wavelength to cover important applications such as Wavelength Division Multiplex systems (WDM), or Dense Wavelength Division Multiplex (DWDM) systems. Referring to FIG. 5, the MPFDR 29 is configured so that the tunable optical transmitter 30 is tunable in wavelength to selectively provide wavelengths of either $\lambda_1, \lambda_2, \lambda_3 \ldots \lambda_n$ for the optical carrier beam. In this embodiment, a swept frequency transmitter/receiver 2, operates in the RF or microwave frequency range, and transmits a number of measurement frequencies. The first signal at $f_1$ is sent to a microwave 3-port component 3 such as but not limited to a microwave circulator. The circulator or similar component 3 directs the signal to an optical transmitter 30 that converts the RF or microwave signals into optical signals. The modulated optical carrier beam is set to $\lambda_1$ and sent over an optical fiber 5 or optical integrated circuit (not shown) to an optical 3-port component 6. The optical signal exits the 3-port optical component 6 and is then sent to a wavelength selective passive or active optical component 31, which has one input and multiple outputs that separate the optical wavelengths $\lambda_1$, $\lambda_2, \lambda_3 \ldots \lambda_n$. At one output of this component 31 a fault 8 exists. When the optical signal encounters a fault 8, a reflected signal is sent back to the optical 3-port component 6, and directed therefrom over optical fiber 9, or an optical integrated circuit (not shown), into an optical receiver 10. The optical receiver 10 converts the optical signal back to the electrical domain into a microwave signal. The microwave signal is then directed back to the microwave 3-port component 3, which sends the signal back to the swept frequency transmitter/receiver 2, and therefrom to the FFT transformer 11, which stores the signal's phase and amplitude information. Once the number of measurement frequencies is completed, the microwave signal is then transformed from the frequency domain to the time domain via Fast Fourier Transformer 11. A fast Fourier transform is performed on the signals to determine the distance to fault 8. The fault location is shown on a display 12. The optical transmitter 30 is then set to output an optical carrier of wavelength 2, the aforesaid measurement sequence is repeated, and repeated again for each wavelength until the optical transmitter is set to the last wavelength $\lambda$.

In another embodiment, the MPFDR can be used as a hyperspectral imaging system for in vivo optical diagnostics in medical applications for both broad area use such as in an endoscope, or for biometric imaging for identification of people. This technique can also be used for distance measurements in free space. In this embodiment, am MPFDR 32 shown in FIG. 6 includes a swept frequency transmitter/receiver 2, which operates in the RF or microwave frequency range, and sends out a specified number of measurement frequency signals over a specified bandwidth. The signal at frequency $f_1$ is sent to a microwave 3-port component 3, such as but not limited to a microwave circulator. The circulator 3 or similar component directs the signal to a tunable optical transmitter 30 that converts via modulation the RF or microwave signal to an optical signal. The optical signal is sent over an optical fiber 5 or optical integrated circuit to an optical 3-port component 3. The optical signal exits the 3-port optical component and is sent to an optical scanning mechanism 33, which uses the optical signal to perform a two-dimensional scan of a selected area. At points in space, the optical signal encounters on object 34 from which signals are reflected back to the optical scanner 33. From there the reflected signal is sent back to the optical 3-port component 3, and therefrom is sent over optical fiber 9 or on optical integrated circuit (not shown), and directed into an optical receiver 10. The optical receiver 10 converts the signal back to the electrical domain. The converted signal is then directed back to the microwave 3-port component 3 which sends the signal back to the swept frequency transmitter/receiver 2, and therefrom the phase and amplitude information is stored in the FFT transformer 11. This cycle is repeated until the number of specified measurement frequencies is completed from $f_1$ to $f_n$, where $f_n$ is the final measurement frequency. The optical transmitter is then set to wavelength, $\lambda_2$, and the measurement is repeated for each wavelength until the optical transmitter is set to the last wavelength $\lambda_n$. The value of n is determined by the expected reflection of light from the surface or object of interest.

Figure 6:
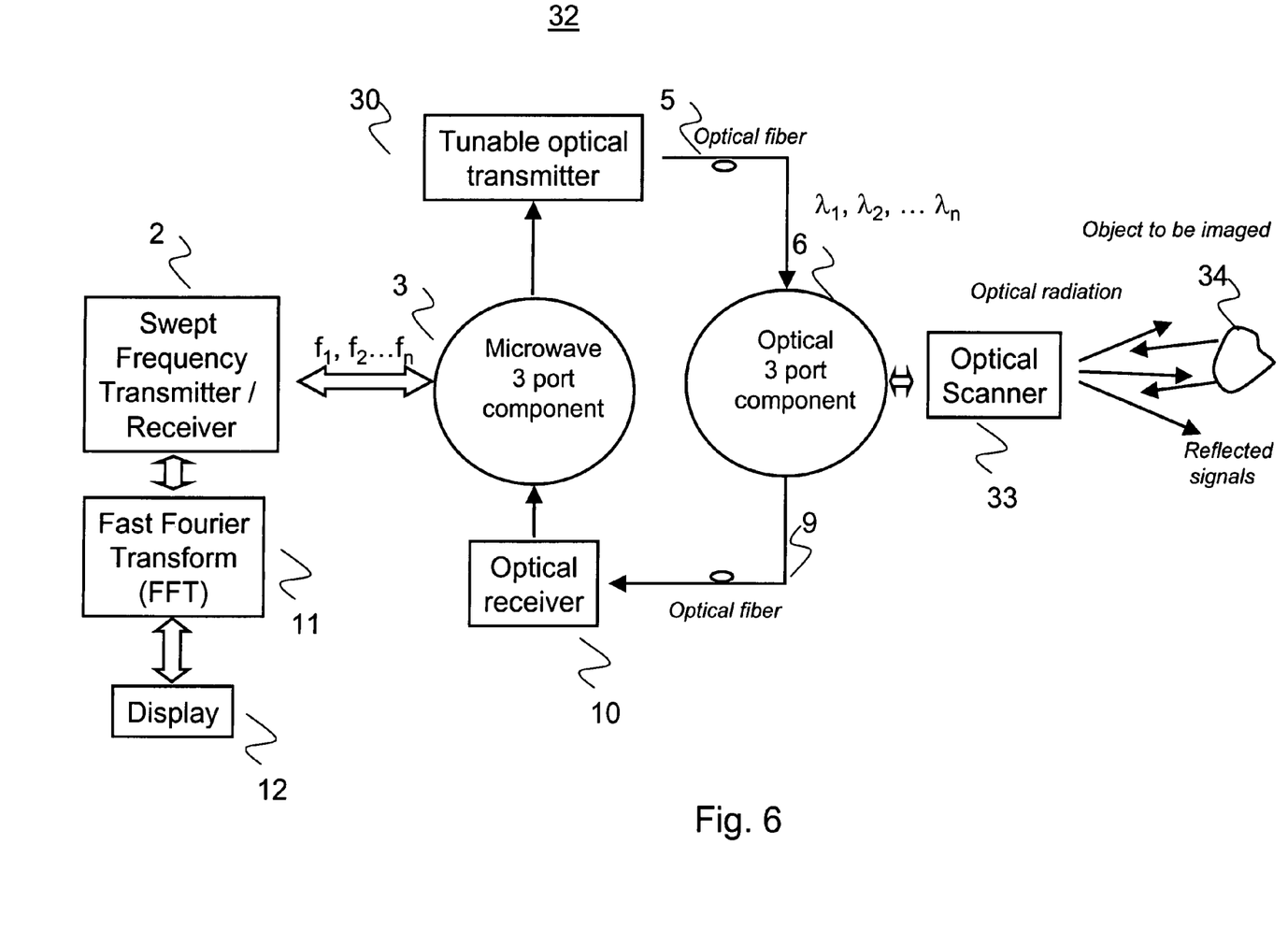
FIG. 6 is a block schematic diagram of the Microwave Photonic Frequency Domain Reflectometer used in a hyperspectral imaging to locate and identify tumors or in biometric imaging application to identify persons for another embodiment of the invention.

The signals are then transformed from the frequency domain to the time domain via the Fast Fourier Transformer 11. A Fast Fourier Transform is performed on the signal to determine the distance from a point of the object in space. A three dimensional picture is developed and shown on the display 12 via scanning of the object. The object visualized could be a tumor that is located but not limited to within the brain or in soft tissue.

Figure 7:
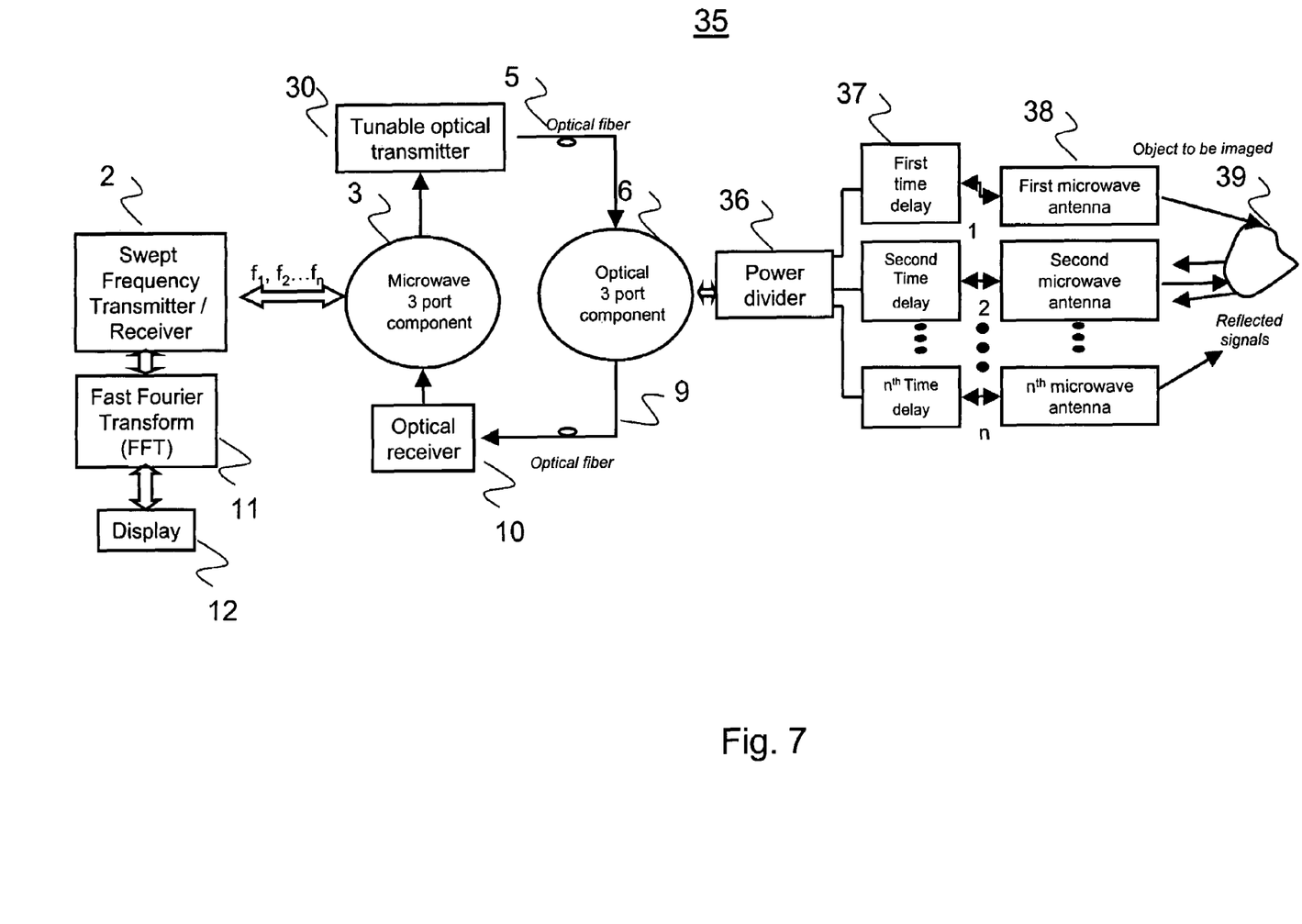
FIG. 7 is a block schematic diagram of the Microwave Photonic Frequency Domain Reflectometer used in a phased array antenna to locate a target for another embodiment of the invention.

In yet another embodiment, the MPFDR 35 inventive technique can be used to function as a phased array antenna as shown in FIG. 7. MPFDR 35 has a similar configuration as MPFDR 1 of FIG. 1, but with the addition of a power divider 36 that divides the optical power of the modulated optical carrier beam into n different signals, where n=1, 2, 3, ... ∞. The optical signals go through and are time delayed and converted into microwave signals via time delays 37. The time delayed microwave signals are connected to a microwave antenna 38, where the signals are radiated, and subsequently reflected from an object 39 in space, in this example. The reflected microwave signal or signals travel back to the antenna 38 and are converted via time delays 37 into an optical signal or signals, which are directed back through the time delays 37 into the optical circulator 6. At this point the data is processed as described for MPFDR 1 of FIG. 1.

Figure 8:
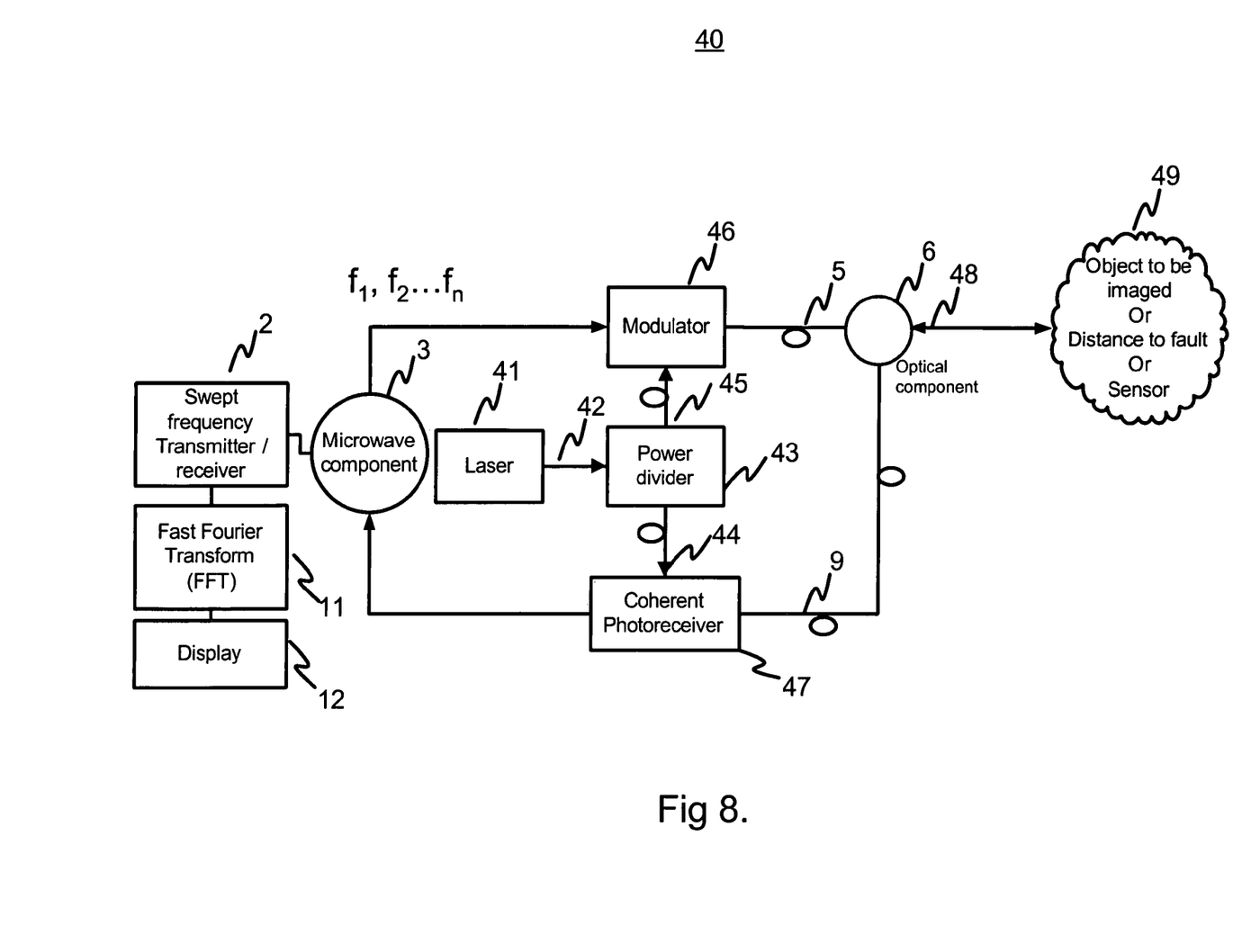
FIG. 8 is a block schematic diagram of the Microwave Photonic Frequency Domain Reflectometer that uses a coherent optical receiver to improve sensitivity for another embodiment of the invention.

In another embodiment of the present invention and MPFDR 40 uses a coherent receiver 47, as shown in FIG. 8. Coherent optical receivers 47 have improved sensitivity compared with direct detection systems. In this configuration the system forms a homodyne coherent system with amplitude shift keying or other modulation format. The laser 41 sends an optical signal over a fiber 42 to a power divider 43. The optical power of the optical signal is divided into two signals of equal power or a predetermined power division ratio, which are sent through fiber optic cables 44 and 45, respectively, to coherent photoreceiver 47, and modulator 46, respectively. A swept frequency transmitter/receiver 2 which operates in the RF or microwave frequency range, sends out a specified number of measurement frequency signals over a specified bandwidth. The first signal at frequency $f_1$ is sent to a microwave 3-port component 3 such as but not limited to a microwave circulator. The circulator or similar component directs the signal to the optical modulator 46 that converts the RF or microwave signal to an optical signal. The optical signal is then sent over an optical fiber 5 or optical integrated circuit (not shown) to an optical 3-port component 6. The optical signal exits the 3-port optical component 6, and is then sent over the optical fiber 9 or through free space 48. When the signal encounters an object or fault 49, the reflected signal is sent back to the optical 3-port component 6. From component 6 the reflected signal is sent over optical fiber 9 or an optical integrated circuit and directed into the optical coherent receiver 47. The optical coherent receiver 47 processes the optical signal from fiber 44 with the reflected signal, and converts the reflected signal back to the electrical domain. The signal is then directed back to the microwave 3-port component 3, which sends the signal back to the swept frequency transmitter/receiver 2, and therefrom the phase and amplitude information is stored in the FFT transformer 11. This cycle is repeated until the number of specified frequencies is completed from $f_1$ to $f_n$, where $f_n$ is the final measurement frequency. The result is shown on the display 12.

Figure 9:
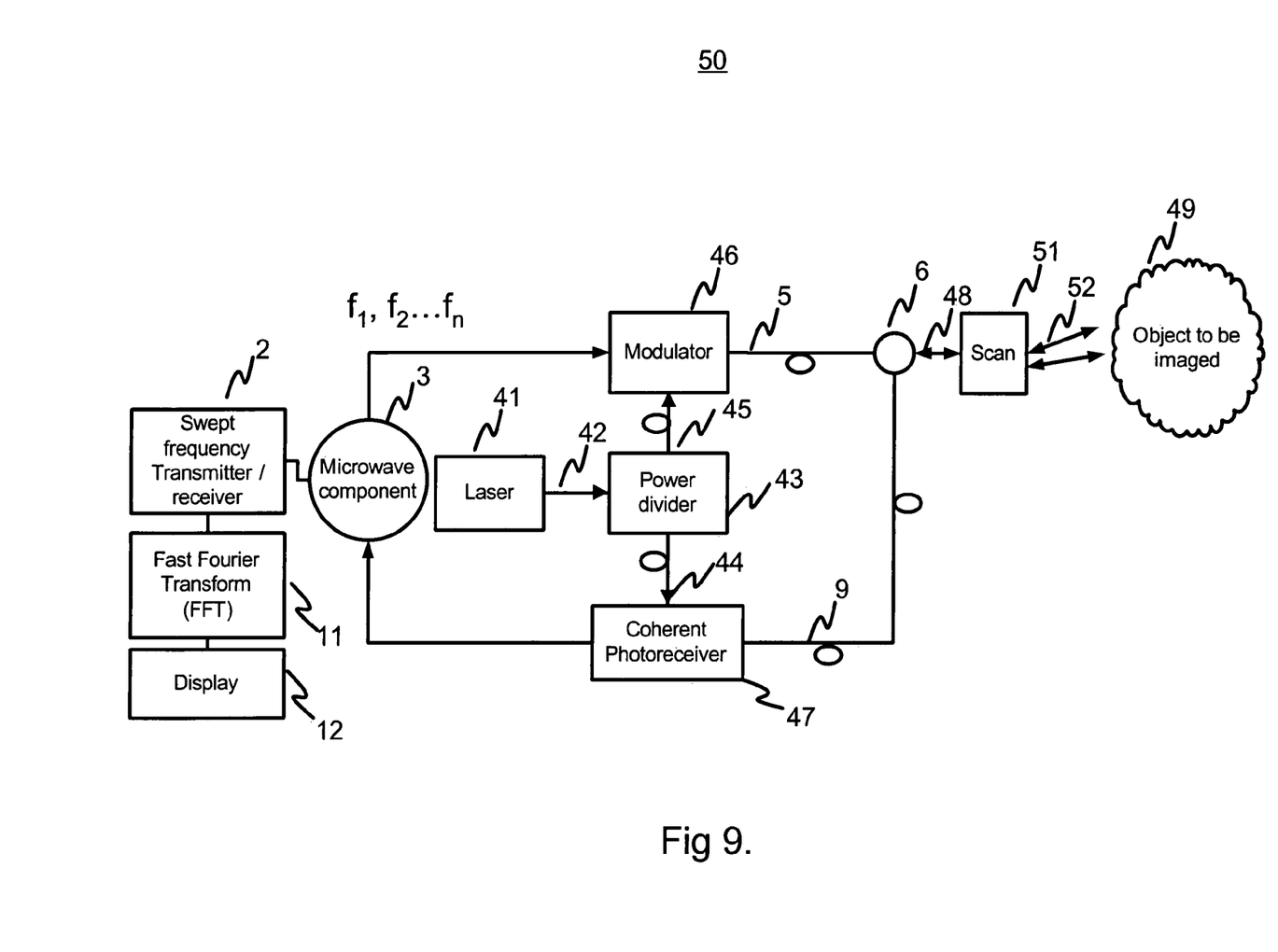
FIG. 9 is a block schematic diagram of the Microwave Photonic Frequency Domain Reflectometer that uses a coherent optical receiver to improve sensitivity and a scanning system to perform imaging of an object for another embodiment of the invention.

In yet another embodiment of the present invention, as shown in FIG. 9, an MPFDR 50 uses a coherent photoreceiver 47 with the addition of a scan system so that an object such as a physical characteristic of a person, or a tumor can be imaged in a biometric medical application, respectively. In this configuration the system forms a homodyne coherent system with amplitude shift keying or other modulation format. The laser 41 sends an optical signal over an optical fiber or fiber optic cable 42 to a power divider 43. The optical power is divided via optical divider 43, and the two optical signals are inputted into optical fibers or fiber optic cables 44, 45, respectively. One optical signal is sent to a modulator 46 via fiber or cable 45, and the other optical signal is sent to a coherent photoreceiver 47 via fiber or cable 44. A swept frequency transmitter/receiver 2 which operates in the RF or microwave frequency range sends out a specified number of measurement frequency signals over a specified bandwidth. The first signal at frequency $f_1$ is sent to a microwave 3-port component 3 such as but not limited to a microwave circulator 3. The circulator or similar component 3 directs the signal to an optical modulator 46 that converts the RF or microwave signal to an optical signal. The optical signal is then sent over an optical fiber or cable 5, or optical integrated circuit, to an optical 3-port component 6. The optical signal exits the 3-port optical component 6, and is sent over the fiber or fiber optical cable 9 to photoreceiver 47. Alternatively, the signal is directed from component 6 to a scan system 51 that deflects the optical beam into two dimensions for scanning xy planes, to form an image. The scanned beams 52 reflect off an object 49 in space to be imaged. Reflected signals are sent back to the optical 3-port component 6, and therefrom sent over optical fiber or cable 9 or over an optical integrated circuit (not shown), and directed into the optical coherent photoreceiver 47. The optical coherent photoreceiver 47 converts the successive signals back to the electrical domain. The signal is then directed back to the microwave 3-port component 3 which sends the signal back to the swept frequency transmitter/receiver 2, and therefrom the phase and amplitude information is stored in the FFT transformer 11. This cycle is repeated until the number of specified frequencies is completed from $f_1$ to $f_n$, where $f_n$ is the final measurement frequency and the result is shown on the display 12.

Although various embodiments of the invention have been shown and described, they are not meant to be limiting. Those of ordinary skill in the art may recognize certain modifications to these embodiments, which modifications are meant to be covered by the spirit and scope of the appended claims.

What is claimed is:

1. A method for providing a reflectometer system for detecting the location of a fault or break in an optical fiber, and/or quality of a optical fiber connector interfaces, and/or insertion loss of an optical fiber, and/or the insertion loss of a complete optical system, comprising the steps of:

successively generating a first plurality of microwave signals each having a different frequency ranging $f_1$, $f_2$, $f_3$ ... $f_n$, respectively, where n=1, 2, 3, ... ∞;

modulating an optical carrier beam with said first plurality of microwave signals for converting the latter into a plurality of optical signals each having a different frequency;

successively directing said plurality of optical signals against an optically reflective surface of interest;

successively receiving successive ones of said plurality of optical signals reflected from said optically reflective surface;

successively converting the received reflected said plurality of optical signals into a plurality of second microwave signals;

successively performing a fast Fourier transform on said plurality of second microwave signals to convert them from the frequency domain to the time domain; and successively processing the time domain based plurality of second microwave signals to extract information of interest relative to said optically reflective surface.

2. The method of claim 1, further including the step of:

displaying the information of interest extracted from the time domain based plurality of second microwave signals.

3. The method of claim 1, wherein said generating step includes selectively operating a swept frequency transmitter/receiver to produce said first plurality of microwave signals.

4. The method of claim 1, wherein said modulating step employs an optical transmitter for making the required conversion.

5. The method of claim 1, wherein said directing step further includes the step of:

feeding said plurality of optical signals into one end of an optical fiber to detect the location of a fault in the fiber, whereby the fault acts as said optically reflective surface.

6. The method of claim 5, wherein said processing step includes the step of:

determining the distance from the fault to said one end of the optical fiber, by measuring the analogous time it took the plurality of second microwave signals to reflect back from the fault to said reflectometer, to determine the distance therebetween.

7. The method of claim 1, further including:

said modulating step successively modulating a plurality of optical carrier beams each of different wavelength ranging $\lambda_1, \lambda_2, \lambda_3 \ldots \lambda_n$, where n=1, 2, 3 ... ∞, each with said first plurality of microwave signals;

said directing step further including:

inputting said plurality of modulated optical carrier beams into an optical multiplexer;

outputting from said multiplexer individual ones of said plurality of optical carrier beams, each of a different wavelength, into a plurality of individual optical fibers, respectively, under test to determine the location of fiber faults therein.

8. The method of claim 1, wherein said directing step includes:

inputting said plurality of optical signals into an optical scanner; and coupling an output of the optical scanner to a patient's body for scanning an organ or tumor therein.

9. The method of claim 8, wherein said step of displaying provide an image of said organ or tumor.

10. The method of claim 1, wherein said directing step further includes the steps of:

dividing the power of each successive one of said plurality of optical signals into first through $n^{th}$ secondary optical signals, where n=1, 2, 3, ... ∞;

inputting said first through $n^{th}$ secondary optical signals into first through $n^{th}$ optical time delays, respectively, for conversion into time delayed microwave signals; and connecting individually an output of each one of said first through $n^{th}$ optical time delays to first through $n^{th}$ microwave antenna elements of a phased array antenna system to transmit the time delayed first through $n^{th}$ secondary optical signals into space.

11. The method of claim 10, wherein said receiving step includes the steps of:
receiving reflected ones said first through $n^{th}$ secondary optical signals reflected off of an object in space; and
passing said received reflected first through $n^{th}$ secondary optical signals through said first through $n^{th}$ time delays, respectively, and for conversion into said plurality of second microwave signals.

12. The method of claim 1, further including:
said directing step including the steps of:
dividing said plurality of optical signals into first and second pluralities of optical signals, respectively, of equal power;
modulating said first plurality of optical signals;
passing the modulated said first plurality of optical signals to strike said optically reflective surface; and
said receiving step including the steps of:
providing a coherent photoreceiver;
passing said second plurality of optical signals to said coherent photoreceiver;
passing reflected ones of said first plurality of optical signals to said coherent photoreceiver to internally process with said second plurality of optical signals; and
passing optical signals processed by said coherent photoreceiver for conversion in said converting step.

13. The method of claim 1, further including:
said directing step including the steps of:
dividing said plurality of optical signals into first and second pluralities of optical signals, respectively, of equal power or a predetermined power division ratio;
modulating said first plurality of optical signals;
using the modulated said first plurality of optical signals to scan an object to be imaged, said object having an optically reflective surface; and
said receiving step including the steps of:
providing a coherent photoreceiver;
passing said second plurality of optical signals to said coherent photoreceiver;
passing reflected ones of said first plurality of optical signals to said coherent photoreceiver to internally process with said second plurality of optical signals; and
passing optical signals processed by said coherent photoreceiver for conversion in said converting step.

14. A reflectometer for detecting the location of a fault or break in an optical fiber, and/or quality of a optical fiber connector interfaces, and/or insertion loss of an optical fiber, and/or the insertion loss of a complete optical system, comprising:
microwave transceiver means for selectively successively transmitting and receiving a plurality of first microwave signals having frequencies ranging $f_1, f_2, f_3 \ldots f_n$, where $n=1, 2, 3, \ldots \infty$;
conversion means for receiving said plurality of microwave signals from said transceiver means to convert said signals into a plurality of optical signals;
directing means receptive of said plurality of optical signals for causing these signals to be directed against an optically reflective surface of interest, whereby reflected ones of said plurality of optical signals are returned to said directing means;
an optical receiver connected to said directing means for receiving therefrom the reflected optical signals, for converting the latter into reflected microwave signals;
said microwave transceiver means being coupled to said optical receiver for receiving said reflected microwave signals; and
fast Fourier transformer means connected to said swept frequency transmitter/receiver, for first storing, and later transforming said reflected microwave signals from the frequency domain to the time domain, for processing to extract information of interest relative to said optically reflective surface.

15. The reflectometer system of claim 14, further including:
display means connected to said fast Fourier transformer means to display the information of interest.

16. The reflectometer system of claim 14, wherein said microwave transceiver means consists of a microwave swept frequency transmitter/receiver.

17. The reflectometer system of claim 14, wherein said conversation means consists of an optical transmitter.

18. The reflectometer of claim 14, wherein said directing means further includes means for feeding said plurality of optical signals into one end an optical fiber to detect the location of a fault in the fiber, whereby the fault acts as said optically reflective surface.

19. The reflectometer of claim 18, further including processing means for measuring the time for said reflected to reflect back from the fault to said reflectometer, to determine the distance therebetween.

20. The reflectometer of claim 14, further including:
said conversion means including means for generating a plurality of optical carrier beams each of a different wavelength, each of said plurality of optical carrier beams being modulated by said plurality of microwave signals respectively; and
an optical multiplexer for multiplexing said plurality of modulated optical carrier beams to produce a plurality of multiplexed ones of the latter, for individual inputting into ends of a plurality of optical fibers, respectively, under test to determine the location of fiber faults therein.

21. The reflectometer of claim 14, wherein said directing means includes:
an optical scanner connected to said conversion means for receiving said plurality of optical signals, for using the later to scan a portion of a human body for imaging an organ or tumor therein, or for providing a biometric identification.

22. The reflectometer of claim 14, wherein said directing means includes:
power divider means for dividing the power of each successive one of said plurality of optical signals into first through $n^{th}$ secondary optical signals, where $n=1, 2, 3, \ldots \infty$;
first through $n^{th}$ optical time delays connected individually to said power divider means to receive and convert said first through $n^{th}$ secondary optical signals into a time-delayed plurality of second microwave signals, respectively;
first through $n^{th}$ optical microwave antenna elements of a phased array antenna system each individually connected to an output of said first through $n^{th}$ optical time delays, respectively, for receiving the time delayed plurality of second microwave signals, respectively, to transmit the latter into space, and to receive back the ones of said plurality of second microwave signals reflected back from an object in space, to permit imagining of said object.

23. The reflectometer of claim 14, further including:
said directing means including:
   means for dividing said plurality of optical signals into a first plurality of optical signals, and a second plurality of optical signals, each of equal power;
   a modulator for receiving and modulating said first plurality of optical signals; and
   means for receiving from said modulator the modulated first plurality of optical signals to cause individual ones thereof to be reflected off of said optically reflective surface; and
said optical receiver including a coherent photoreceiver connected to said dividing means for receiving said second plurality of optical signals, and connected to said receiving means for receiving reflected ones of said first plurality of optical signals, for providing homodyne processing to convert the received reflected optical signals into microwave signals.

24. The reflectometer of claim 23, wherein said receiving means of said directing means includes a scanner for using said modulated first plurality of optical signals to scan an object to be imaged.

25. A reflectometer system for detecting the location of a fault or break in an optical fiber, comprising:
   a microwave swept frequency transmitter/receiver operable for selectively transmitting and receiving a plurality of signals having frequencies ranging $f_1, f_2, f_3 \ldots f_n$, where $n=1, 2, 3, \ldots \infty$;
   an optical transmitter for receiving microwave signals from said microwave swept frequency transmitter/receiver for modulating an optical carrier to provide a plurality of optical signals;
   means receptive of said plurality of optical signals for causing these signals to be directed against an optically reflective surface associated with a fault or break in an optical fiber, whereby reflected optical signals are returned to said receptive means;
   an optical receiver connected to said receptive means for receiving therefrom the reflected optical signals, for converting the latter back into microwave signals;
   said microwave swept frequency transmitter/receiver being coupled to said optical receiver for receiving said reflected microwave signals;
   fast Fourier transformer means connected to said swept frequency transmitter/receiver, for first storing, and later transforming said reflected microwave signals from the frequency domain to the time domain, for processing; and
   display means connected to said fast Fourier transformer means for receiving and processing the time domain based reflected microwave signals to display the location of the fault or break in the optical fiber.

26. The reflectometer system of claim 25, wherein said optical transmitter is tunable for selecting a plurality of different wavelengths for said optical carrier.

* * * * *